Feb. 8, 1938.                J. M. PESTARINI                2,107,740
                    ELECTRIC DIRECT CURRENT TRANSFORMER
                    Filed Feb. 21, 1935        2 Sheets-Sheet 1
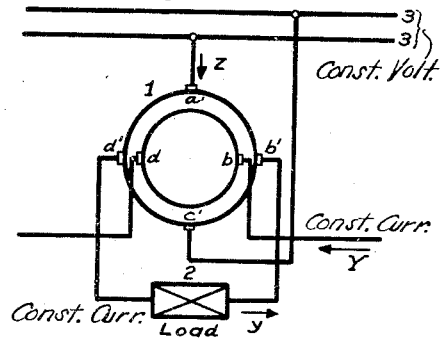
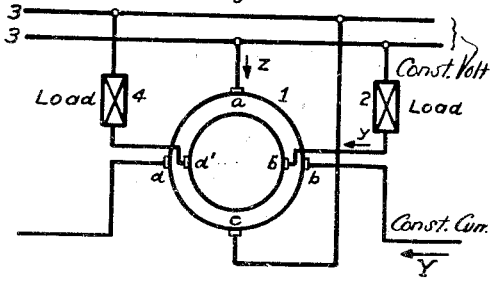
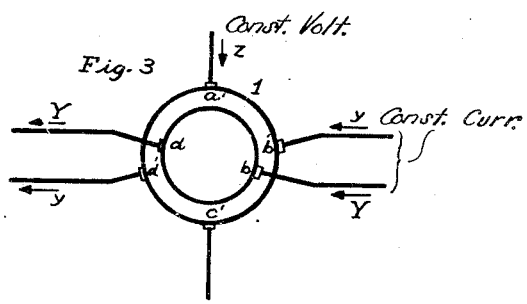
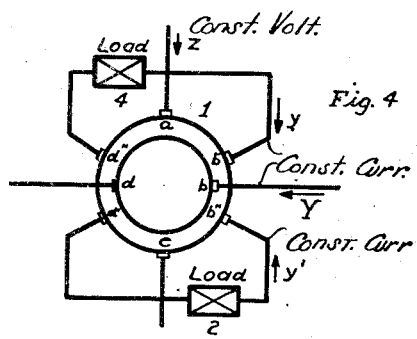
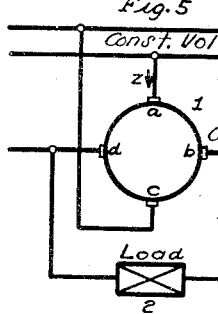
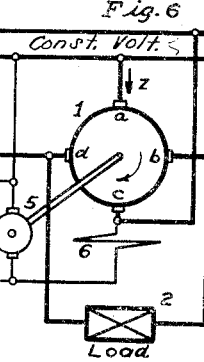
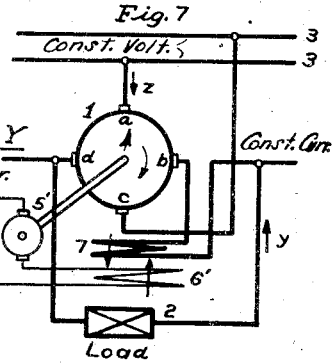
INVENTOR.

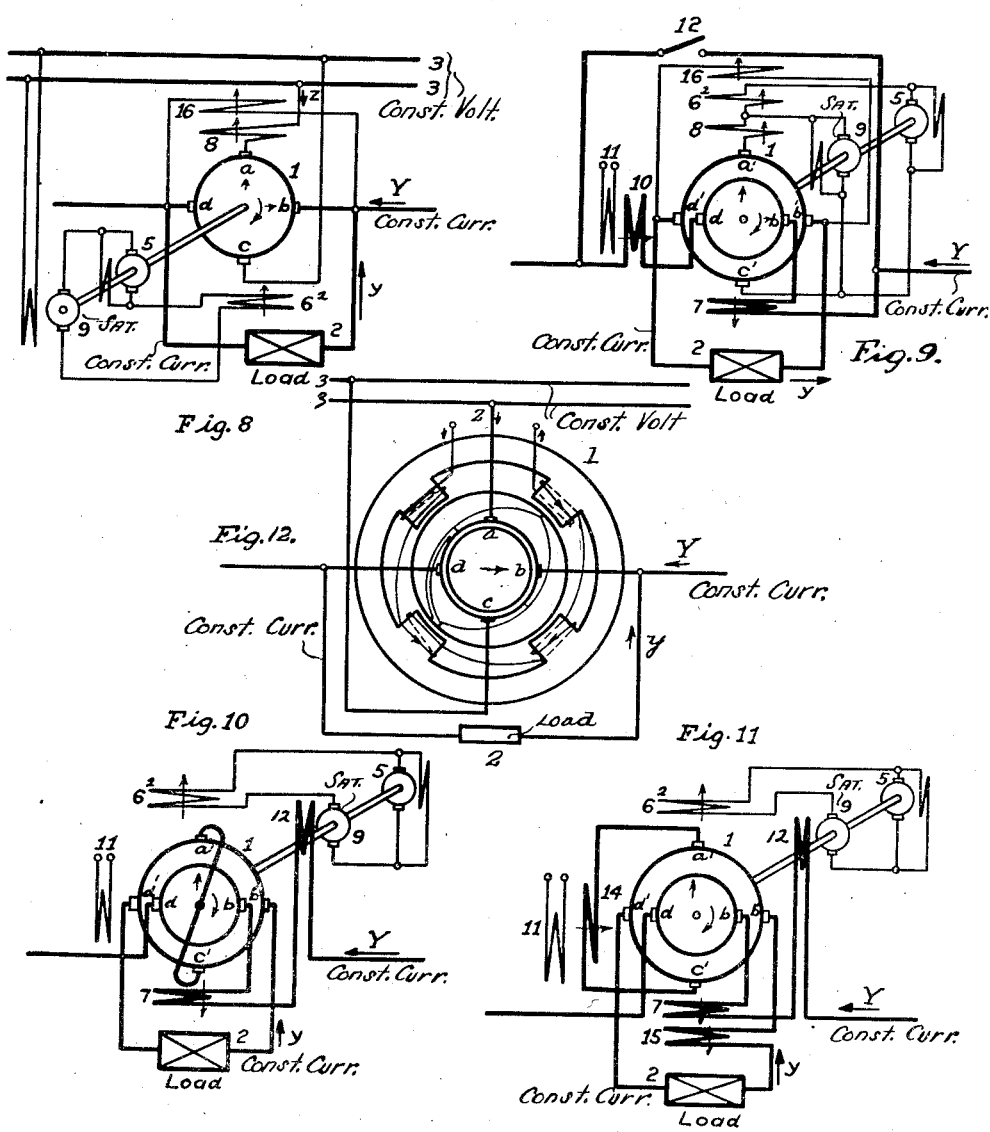

Patented Feb. 8, 1938

2,107,740

UNITED STATES PATENT OFFICE 2,107,740

ELECTRIC DIRECT CURRENT TRANS-
FORMER

Joseph Maximus Pestarini, Grant City,
Staten Island, N. Y.

Application February 21, 1935, Serial No. 7,595
In Italy February 28, 1934

7 Claims. (Cl. 171—123)

This invention relates to machines inserted in a series distribution, where all consumers are connected in series with one another and they form a single circuit fed by a generator, or by many generators supplying direct current of an essentially constant intensity, say Y. This value may be unsuitable for some of the consumers, for instance it may be too large for some of the consumers requiring a relatively little power; if these consumers were to be directly inserted in the circuit traversed by the current Y, they must be provided with a commutator disproportionally large. Hence the utility of having transformers inserted in the main series circuit traversed by the current Y and which we may call primary circuit, and supplying current at constant intensity, say $y$, to other circuits which we may call secondary circuits. The scope of this invention is to disclose means for building electrical machines performing the desired transformation of the electrical energy, in a simple and effective way.

The machine object of this invention is a metadyne having special improved features. The metadyne has been the subject of many previous U. S. A. applications, for instance Patents No. 1,969,699; No. 1,945,447; No. 1,962,030; No. 1,967,159.

The metadyne is essentially a direct current rotating machine having a rotor with windings and commutators like a conventional dynamo, and a stator affording a path of low reluctance to the flux created by the rotor ampere turns; two sets of brushes are generally provided, the current traversing each set creating by its rotor ampere turns a flux inducing an electromotive force between brushes of the other set; one set called primary and traversed by a current called primary current has its brushes connected to the primary network originally supplying energy, and the other set, called secondary and traversed by a current called secondary, has its brushes connected to the secondary network. The stator of the metadyne may be provided with windings which endow the metadyne with the desired characteristics suitable to the application in consideration. A description in detail of the metadyne principles is given in a paper entitled "Esquisse sur la metadyne" by J. M. Pestarini, in the "Bulletin Scientifique A. I. M." No. 4, April 1931 of "L'Association des Ingeineurs electriciens" published by the "Institut Electrotechnique Montefiore," Liege, Belgium.

The metadyne, object of this invention, is an improved form of the original one and it is provided with three sets of brushes; a first set has its brushes, which we will call primary brushes, connected to the primary circuit traversed by the primary current Y; a second set has its brushes which we will call secondary brushes, connected to the secondary circuit or circuits traversed by the secondary current $y$ or the secondary currents $y_1$, $y_2$, $y_n$ in case there are many distinct secondary networks; finally a third set has its brushes, which we will call tertiary brushes, traversed by a current, say $z$, called tertiary current, which creates the flux inducing the electromotive force supplied to the secondary circuit or circuits.

In the metadyne, object of the present invention, the tertiary brushes are kept under a constant difference of voltage, essentially induced by a flux created by the algebraic sum of the rotor ampere turns due to the primary current Y and the secondary current $y$, or the secondary currents $y_1$, $y_2$, $y_n$. As the difference of potential between the tertiary brushes is constant, the above mentioned flux must be necessarily constant, assuming the angular speed of the metadyne is constant, and therefore the sum of the ampere turns which create this flux will be kept constant, and as the primary current Y is constant, the secondary current $y$ will be constant. In case of many secondary circuits, a definite linear combination of the secondary currents, $y_1$, $y_2$, $y_n$, will be kept constant.

The invention will be better understood with the aid of the schemes here attached. Fig. 1, and Fig. 2 show the general principle, the former with only one secondary circuit, and the latter with two secondary circuits; Fig. 3 shows a particular location of the primary and secondary brushes; Fig. 4 shows a metadyne with two secondary circuits with a different disposition than the one represented by Fig. 2; Fig. 5 is an alternative of Fig. 1 the metadyne being provided with a single commutator instead of the two commutators shown by Fig. 1; Figs. 6, 7, 8, and 9 show arrangements for keeping the speed of the metadyne constant, further Fig. 9 shows a complete scheme including arrangements for starting and stopping the metadyne; Figs. 10 and 11 show two alternatives of a complete scheme, the tertiary brushes being kept at a difference of potential substantially equal to zero. Figure 12 shows the stator arrangement of the alternative form of Figure 5.

Referring to Fig. 1 the metadyne 1 is provided with two separate rotor windings, each of them being connected to a commutator. The primary current Y enters the primary winding of the rotor through the brushes $b$ and $d$ diametrically opposite, while the secondary current $y$ feeding the load 2 is supplied by the secondary rotor winding through the brushes $b'$ and $d'$, the commutation axis of the primary current coinciding with the commutation axis of the secondary current. The tertiary current $z$ enters the secondary rotor winding through the diametrical opposite brushes $a'$ and $c'$, the tertiary commutating axis being electrically perpendicular to the primary and secondary commutating axis. The tertiary brushes $a'$ and $c'$ are connected to a network 3, 3 of direct current at constant voltage; therefore the flux created by the primary and secondary rotor ampere turns must be constant, as this flux must induce the tertiary counter-electromotive force, the speed of the metadyne being assumed constant. The primary current Y is constant and gives constant ampere turns, hence the secondary ampere turns must in its turn be constant and therefore the current $y$ will be constant as it is desired. On the contrary, the tertiary current $z$ will vary and it will create by its rotor ampere turns the necessary flux for inducing between the secondary brushes the voltage required by the load and simultaneously between the primary brushes the counter-electromotive force absorbed from the primary circuit.

In Fig. 1 the tertiary brushes have been shown bearing upon the secondary rotor winding, but they may bear upon the primary rotor winding or even upon a separate rotor winding; this will not affect the main operation of the machine.

Fig. 2 shows a similar arrangement but the secondary circuits are now two, and the two distinct loads 2 and 4 are connected between a secondary brush and a tertiary brush, the load 2 being connected between the secondary brush $b'$ and the tertiary brush $a$, and the load 4 being connected between the secondary brush $d'$ and the tertiary brush $c$ reminding thus somehow the already known "eight connected" metadyne described in previous patents relating to the metadyne. The circuit is closed as follows. Starting from the upper constant voltage line 3, traverse load 4, enter metadyne through brush $d'$ leaving metadyne through brush $b'$, traverse load 2 arrive at lower conductor 3 of the constant voltage network, enter metadyne through brush $a$, leave metadyne through brush $c$ and finally close the circuit arriving at the upper conductor 3. Though the most convenient mutual disposition of the brushes for the most frequent applications is given by Figures 1 and 2, many other dispositions may be adopted remaining in the spirit of the present invention. Thus Fig. 3 shows the primary and secondary commutating axis slightly shifted from one another allowing thus for eventual separated primary and secondary commutating poles; Fig. 4 also shows another disposition of the secondary brushes $b'$, $d'$, $b''$, $d''$, supplying two different secondary circuits with two different loads 2 and 4.

So far we have assumed two rotor windings, one for the primary and another for the secondary current. Sometimes the conditions of operation permit to combine the two rotor windings into only one as Fig. 5 shows where the primary and the secondary brushes have also been combined into a single set. It is important to notice that in this case the rotor is traversed by only the difference of the primary and secondary current (i. e. by the current $Y+y$ where $y$ and $Y$ have generally opposed directions.)

Figure 12 shows diagrammatically the stator arrangement of the alternative construction shown in Figure 5. Although the machine has only two poles, the stator is provided with four polar segments, in order to afford a satisfactory commutation under the four brushes. The figure shows clearly that in their commutating position the conductors of the armature coils are not under the polar segments and are instead situated on the axes $a$—$c$ and $b$—$d$ of the interspace between said polar segments. Thus commutation takes place satisfactorily, more particularly when interpoles are provided on the axes $a$—$c$ and $b$—$d$. A similar stator arrangement is disclosed in some prior patents to the same applicant, for instance in Patents Nos. 1,967,159, 1,962,039, and 2,038,380.

For maintaining the speed constant we may generally adopt any device used for this purpose and described in previous patents relating to the metadyne. Particularly, we may use the regulator dynamo. In Fig. 6 the regulator dynamo, is shown at 5, and it is a shunt dynamo rotating at its critical speed and opposing the constant voltage network 3, 3. The current supplied or absorbed by the regulator dynamo traverses the regulator winding 6, which is a stator winding of the metadyne disposed in such a way as to create a torque by its electro-magnetic action on the rotor currents and preferably on the primary and secondary currents as shown on the figure. Fig. 7 gives another scheme where the regulator dynamo $5'$ is a series dynamo connected to the regulator winding $6'$. The resistance of the circuit of the regulator dynamo is so adjusted as to obtain a setting up of current exactly at the desired normal speed, in other words the critical speed of the series dynamo generator $5'$ is made equal to the desired normal speed. While in the case of Fig. 6 the regulator current may have either directions, say the positive direction for creating an accelerating torque and the negative direction for creating a braking torque, in the case of Fig. 7 the series regulator dynamo creates only a negatve current, and a negative torque, therefore the metadyne must be provided with some stator field creating a strong positive torque in order to allow for an adjustment. In Fig. 7 the winding 7 traversed by the current $Y+y$ creates such a positive strong torque.

In Fig. 8 the regulator dynamo 5 opposes a small dynamo 9 called "base dynamo" generally very very saturated and inducing a voltage which varies with the speed as little as possible; the regulating current traverses the regulator winding $6^2$ of the metadyne 1.

In the same Fig. 8 a winding 8 is shown creating ampere turns in the same direction as the rotor ampere turns of the tertiary current $z$, reducing thus the value of the said tertiary current absorbed from the constant voltage network 3, 3. The same scheme has the addition of the winding 16 creating ampere turns in the same direction as the rotor ampere turns of the tertiary current $z$ assuming the winding 16 would not exist; the winding 16 is connected across the brushes $b$ $d$ supplying the voltage required by the load 2.

By the action of the windings 8 and 16 the value of the tertiary current $z$ may be reduced to a very small one, and therefore this current may be supplied even by the small base dynamo 9 as shown by Fig. 9. The winding $6^2$ traversed by the regulator current supplied by the regulator dynamo 5, is still the regulator winding that adjusts the resultant torque to be exactly that necessary for keeping the whole set running at the normal speed.

The scheme of Fig. 9 embodies some further improvements: On the stator of the metadyne a winding 10 is provided traversed by the primary current Y, and having its magnetic axis in the same line as the rotor primary ampere turns. The number of turns of this winding and its connection will obviously vary the value of the constant ratio of the intensity of the currents Y and y. The same effect would have a stator winding having the same magnetic axis but traversed by the secondary current y. Finally an analogous but more limited effect will have a stator winding 11 having the same magnetic axis and independently excited.

The metadyne is further provided with a winding 7 traversed by the primary current and creating an accelerating torque by means of its electromagnetic action upon the primary and the secondary rotor ampere turns. Thus for starting the metadyne, it suffices to open the key 12; the metadyne will start and reach its normal speed where it will regularly operate; closing the key 12 will stop the metadyne.

Figure 10 shows the scheme of an alternative of Fig. 9; the main difference consists in the tertiary brushes $a'$ and $c'$ being short circuited, on the scheme of Fig. 10. In other words, the constant difference of potential impressed on the tertiary brushes is here zero.

In Fig. 8 the base dynamo 9 is excited by a coil connected to the constant voltage network 3, 3; in Fig. 9 the base dynamo is shunt excited, and finally in Fig. 10 the base dynamo is excited by a coil 12 traversed by the primary constant current Y.

Fig. 11 shows a scheme very similar to the one shown by Fig. 10 except for the addition of the two stator windings 14 and 15; the former is traversed by the tertiary current $z$ and induces an electromotive force between the tertiary brushes $a'$ $c'$ opposing the tertiary current $z$; the latter is traversed by the secondary current $y$ and induces an electromotive force between the secondary brushes $b'$ and $d'$ opposing the secondary current. Thus the operation of the metadyne becomes more stable. Wherever it was necessary I have placed arrows to show the relative action of stator and rotor ampere turns: assuming the armature winding to be a clockwise winding and the revolution to be in clockwise direction. Further, to keep the speed constant the direction of the current in the stator winding 6 is not constant and its ampere turns change in direction; nevertheless, in order to indicate a direction of the field winding 6, I have supposed the speed for a given load to be slightly higher than the normal one. No arrow has been placed on the winding 11, which controls the ratio of the values of the constant currents, because the ampere turns of this winding may be given either direction according to the value of the desired ratio.

One versed in the art may easily combine the various arrangements here above disclosed and he may modify them yet remaining within the scope of the present invention.

Having now particularly described and ascertained the nature of my said invention, and in what manner the same is to be performed, I declare that what I claim is:

1. In an electrical machine of the metadyne type for transforming constant direct current supplied from a primary network, into substantially constant current of another value supplied to a secondary network, a rotor armature and a stator structure, said armature having commutating means including primary, secondary and tertiary sets of brushes, the primary set determining a commutating axis and connected to the constant current network, the secondary set determining a commutation axis nearly parallel to the primary commutating axis and connected to the secondary network, the tertiary set determining a commutation axis electrically substantially perpendicular to the primary and secondary commutation axis, a stator winding located in the axis of said tertiary brushes, a saturated dynamo driven by the rotor of the metadyne, supplying substantially constant voltage to the said stator winding, a stator winding of low resistance connected across the tertiary brushes and located in the commutating axis of the primary and secondary brushes, the stator also provided with a winding located in the axis of the tertiary brushes and connected in series with the primary brushes supplied with constant current.

2. In an electrical machine of the metadyne type for transforming constant direct current supplied from a primary network, into substantially constant current of another value supplied to a secondary network, a rotor armature and a stator structure, said armature having commutating means including primary, secondary and tertiary sets of brushes, the primary set determining a commutating axis and connected to the constant current network, the secondary set determining a commutation axis nearly parallel to the primary commutating axis and connected to the secondary network, the tertiary set determining a commutation axis electrically substantially perpendicular to the primary and secondary commutation axis, a saturated dynamo driven by the rotor and supplying substantially constant voltage, a shunt dynamo driven by the rotor and supplying current at a voltage varying with rotor speed, a stator winding located in the axis of the tertiary brushes and supplied with current by the opposed E. M. F.'s of the two dynamos, a stator winding of low resistance connected across the tertiary brushes and located in the commutating axis of the primary and secondary brushes, the stator also provided with a winding located in the axis of the tertiary brushes and connected in series with the primary brushes supplied with constant current.

3. A machine as set forth in claim 1 in which the saturated dynamo is excited by a constant current winding in series with the primary brushes of the metadyne.

4. A machine as set forth in claim 2 in which a stator winding in series with the secondary brushes is located in the commutating axis of the primary brushes.

5. Electrical system for transforming a primary constant direct current into a secondary constant direct current of another value, comprising in combination, a primary constant current distributing network, a secondary consumer network carrying constant direct current of another value, a metadyne machine provided with commutating sets of brushes so located as to form two commutating axes substantially at 90° to each other, means for the commutation of the primary and secondary constant currents along the first of the said commutating axes, means for keeping the potentials of each brush of the set corresponding to the second of said commutating axes substantially constant during operation, means for the commutation of the current collected by said brushes, means for keeping the speed of the metadyne machine at a practically constant value comprising a stator winding upon the metadyne having its magnetic axis in the direction of the second of the said commutating axes, a dynamo-machine driven by the metadyne, the stator winding of said metadyne being traversed by a current sensitive to any difference in the metadyne speed from a desired value, said current being substantially the armature current of said dynamo machine, the building up speed of which machine corresponds exactly to the desired speed of the metadyne stator winding on the metadyne having their magnetic axis in the direction of the first mentioned commutating axis and setting up controlled ampere turns thereby controlling the ratio of the primary constant current to the secondary constant current, stator windings on the metadyne having their magnetic axis in the direction of a commutating axis, traversed by the current commutated in the other commutating axis and inducing an E. M. F. opposing said current.

6. Electrical system for transforming a primary constant direct current into a secondary constant direct current of another value, comprising in combination, a primary constant current distributing network, a secondary consumer network carrying constant direct current of another value, a metadyne machine provided with commutating sets of brushes so located as to form two commutating axes substantially at 90° to each other, means for the commutation of the primary and secondary constant currents along the first of said commutating axes, means for keeping the potential of each brush of the set corresponding to the second of said commutating axes substantially constant during operation, means for the commutation of the current collected by said brushes, means for keeping the speed of the metadyne machine at a practically constant value comprising a stator winding upon the metadyne having its magnetic axis in the direction of the second of said commutating axes, an unsaturated shunt dynamo-machine driven by the metadyne and connected to a direct current source of substantially constant voltage, for feeding with its armature current responding to differences in speed said metadyne stator winding, stator windings on the metadyne having their magnetic axis in the direction of the first mentioned commutating axis and setting up controlled ampere turns thereby controlling the ratio of the primary constant current to the secondary constant current, stator windings of the metadyne having their magnetic axis in the direction of a commutating axis, traversed by the current commutated in the other commutating axis and inducing an E. M. F. opposing said current.

7. Electrical system for transforming a primary constant direct current into a secondary constant direct current of another value, comprising in combination, a primary constant current distributing network, a secondary consumer network carrying constant direct current of another value, a metadyne machine provided with commutating sets of brushes so located as to form two commutating axes substantially at 90° to each other, means for the commutation of the primary and secondary constant currents along the first of said commutating axes, means for keeping the potential of each brush of the set corresponding to the second of said commutating axes substantially constant during operation, means for the commutation of the current collected by said brushes, means for keeping the speed of the metadyne machine at a practically constant value comprising a stator winding upon the metadyne having its magnetic axis in the direction of the second of said commutating axes, two shunt dynamo-machines unsaturated and strongly saturated, respectively, driven by the metadyne and generating by the difference in their opposed electromotive forces a current responding to the differences in speed and traversing said stator winding of the metadyne, stator windings on the metadyne having their magnetic axis in the direction of the first mentioned commutating axis and setting up controlled ampere turns thereby controlling the ratio of the primary constant current to the secondary constant current, stator windings on the metadyne having their magnetic axis in the direction of a commutating axis and traversed by the current commutated in the other commutating axis and inducing an E. M. F. opposing said current.

J. M. PESTARINI.